May 3, 1960
A. R. CRIPE
2,935,031
WHEEL POSITIONING DEVICE FOR SINGLE
AXLE ARTICULATED TRAINS
Filed Jan. 10, 1956
2 Sheets-Sheet 1
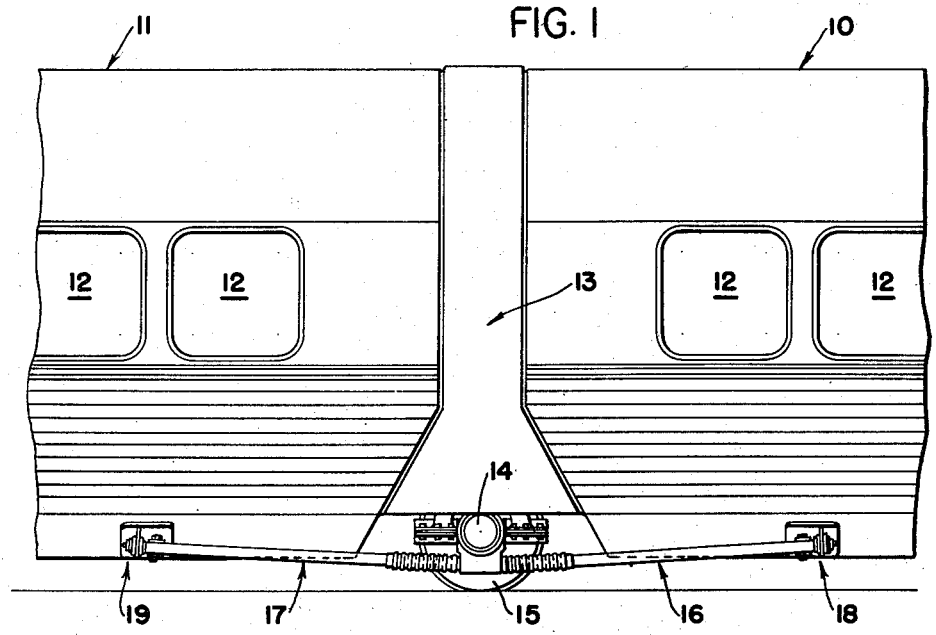
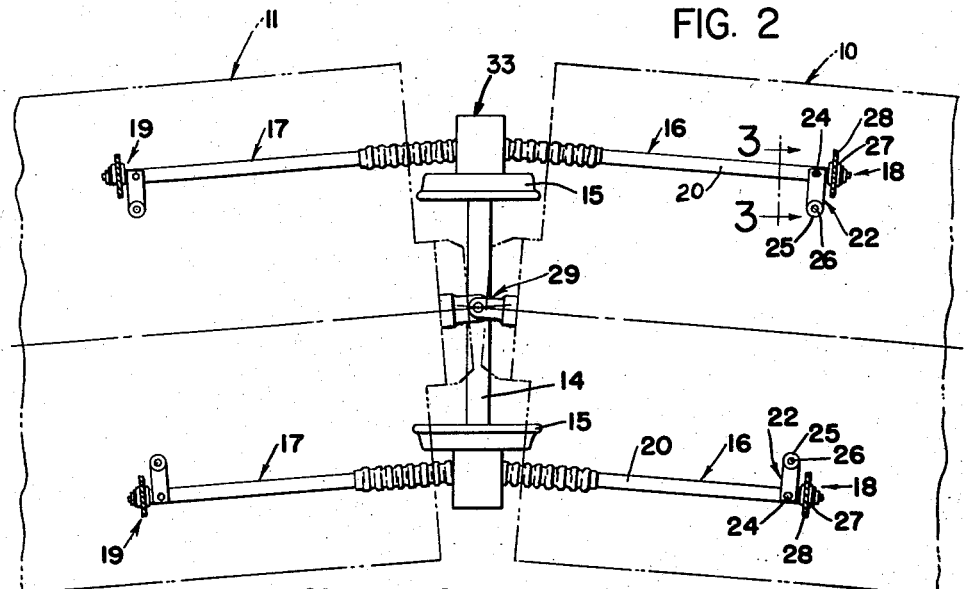
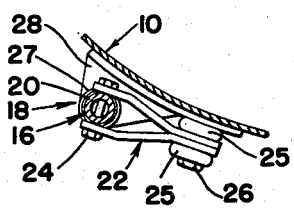
INVENTOR.
ALAN R. CRIPE
BY
*Jay & Jay*
ATTORNEYS

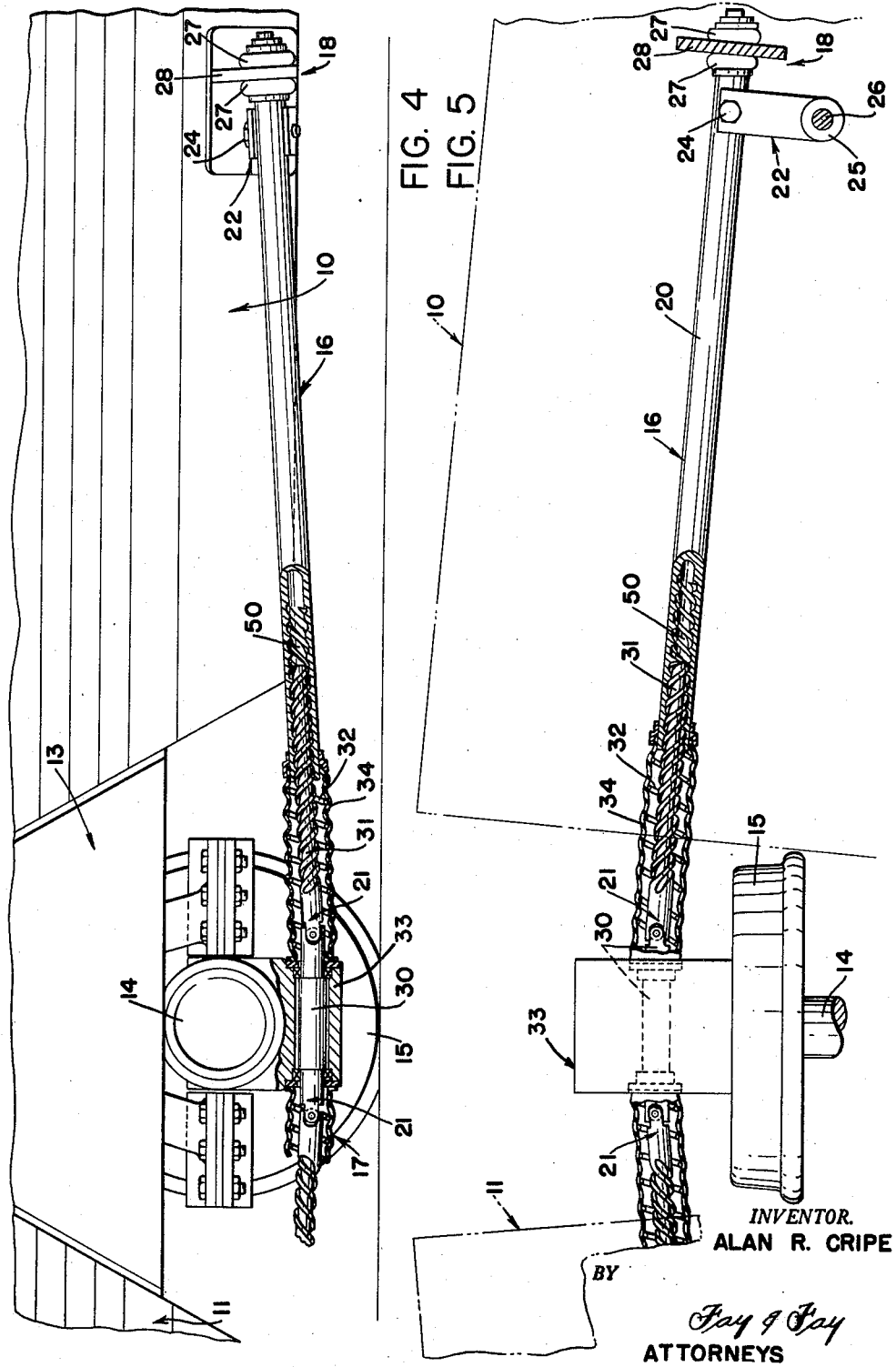

United States Patent Office 2,935,031
Patented May 3, 1960

2,935,031

WHEEL POSITIONING DEVICE FOR SINGLE AXLE ARTICULATED TRAINS

Alan R. Cripe, Chagrin Falls, Ohio, assignor to The Chesapeake and Ohio Railway Company, Cleveland, Ohio, a corporation of Virginia Application January 10, 1956, Serial No. 558,242

2 Claims. (Cl. 105—4)

This invention, relating as indicated to a wheel positioning device for single axle articulated trains, more particularly relates to a guiding system for the cars and suspension system of an articulated train in which there is a single axle and a suspension system between two articulated cars. This particular guiding system is adapted to cause the axle and wheels to have a zero angle of attack to the track whether operating in either direction, i.e., as a bi-directional train. This structure will be hereinafter referred to as a "Drag Link Structure."

In connection with some of the newer light-weight trains, such as Train X, Talgo and other varieties, it has become increasingly important to have a bi-directional train. In the past some of these trains have been uni-directional, but the cost of turning around a uni-directional train is excessive, and already terminal costs are a high fraction of train operation.

In the past all the axle systems have partially solved this problem by the use of swiveling trucks but with lighter weight construction single axles are being employed, and these will have an angular attack to the track or curve if they are attached to the car body, and this limits the train to uni-directional movements.

In order to provide a light-weight train with single axles, it is necessary to have a guided axle system, and a number of these have been developed in the past. These systems must provide means whereby the axle will be almost perpendicular to the track and thus create a zero angle of attack to the track. Under some conditions, modified conditions of this are permissible.

This invention particularly relates, then, to a novel means of centering said axle with respect to the track.

An object of this invention is to provide a novel axle centering system for single axles for articulated trains.

A further object of this invention is to provide a guiding system for single axles in which the axle is in the diaphragm space between the cars of an articulated train and in which the cars are commonly supported on said axle.

To the accomplishment of the foregoing and related ends, said invention, then, consists of the means hereinafter fully described and particularly pointed out in the claims; the annexed drawings and the following description setting forth in detail certain mechanisms embodying this invention, such disclosed means, however, constituting but one of the various mechanical forms in which the principles of the invention may be used.

In the drawings:

Fig. 1 is a fragmentary side view of an articulated train and the cars thereof in which a single axle is shown and the axle guiding mechanism;

Fig. 2 is a phantom top view of the axle guiding system, showing the articulated cars;

Fig. 3 is a cross-sectional view along the lines 3—3 of Fig. 2, showing an enlarged portion of the body mounting means for the drag link structure;

Fig. 4 is an enlarged side view of the wheel, axle and drag link structure and its body mounting supports; and Fig. 5 is a top view of said drag links, showing the cars in phantom on a curve.

In the drawings 10 shows one car of an articulated train and 11 another car. Said cars may have windows shown at 12 and a closure structure between the units generally shown at 13. Said cars are supported on the single axle 14, and a pair of wheels 15 are fixedly mounted to said axle. On either side of the car units is a pair of drag links, shown in Fig. 1 at 16 for the right unit and 17 for the left unit. Each of said drag links has a body mounting bracket which is identical, the right body mounting bracket being shown at 18 and the left one at 19. Said mounting brackets will be more particularly described in connection with Figs. 2, 3, 4 and 5, but the basic principle behind the operation of said drag link is similar on each half. The drag links 16 and 17 are resiliently supported on the drag link mounting brackets 18 and 19 to prevent longitudinal and torsional movements and permitting angular movements with respect to said bracket. At the same time there are universal joints generally indicated at 21. This is necessary because as the cars go around curves to the right or left there must be the ability to accommodate itself to this movement. It will be seen that the drag link structures are rotatably mounted to the axle support means at journal box 33 in such a way that the drag links may shorten or lengthen and the shaft between them may rotate, i.e., there are helical screw threads which are right and left handed thereby permitting the drag links to increase in length or shorten as the cars go around a curve.

This operation is more particularly shown in connection with Fig. 2. It will be seen readily by inspection, when observing this figure, that the drag links on the top of Fig. 2, i.e., on the outside of the curve, are longer than the drag links on the inside of the curve. That is to say, these drag links have lengthened by means of the helical screws while at the same time angular movement has been permitted between the mounting brackets on the cars and the universal joints under the journal box.

The general structure of said drag link 16 is shown in connection with Fig. 3, 20 being the tubular drag link, 22 being the fork structure attached to the drag link by a pin 24 to prevent torsional movement of the drag link tube at the car end. These, in turn, are supported by a pair of resilient mounts 25 and a mounting bracket 26. At the same time the end of the drag link 16 is resiliently mounted in a rubber support or equivalent means 27 to a mounting bracket 28, which is fixedly supported to the car body. The cars are coupled together as is shown at 29 by pin and coupler.

Figs. 4 and 5 show more particularly this structure, but basically the parts are the same as described earlier. The drag link which in this view is indicated as 16, both in the side view shown in Fig. 4 and in the top view shown in Fig. 5. In this position, of course, the drag link will lengthen as the train cars are going around a curve, and this particular drag link is on the outside of the curve. The drag link is resiliently supported by means of the aforementioned yoke and resilient supports earlier described. The drag link is composed of a hollow tube which has a helical screw thread indicated at 50 in the interior surface thereof. Rotatably mounted within journal box 33 is a shaft 30, which is thus fixedly mounted with respect to the axle 14 and wheel 15 against longitudinal movement. Shaft 30 is provided with universal joints 21 at each end which can rotate. In this case a universal joint connection has been used to permit a limited amount of angular movement as would be necessary to accommodate the springing of the cars and depending upon the degree of curvature of the track. Each of the screw threads on the same side of the car are opposite, i.e., right and left hand to allow for uniform action. Fastened to the universal joint is a screw thread 31 mating with the internal screw thread of the drag link structure. On the outside thereof is a spring member 32 and a rubber boot or equivalent means 34 secured at the ends thereof to cover the moving portion of said helical thread. The pitch of the thread is about 45 degrees and will move readily depending upon the position of the train cars on the track. The movement of said drag links is, of course, to unwind and lengthen as the cars separate on the outside of the curve and foreshorten as the cars come together on the inside of the curve. This positions the axle midway therebetween as the pitch of the threads on either of the drag link structures is identical and opposite. By this means the axle will be perpendicular to the track at all times, and the wheel will have what is known as a zero angle of attack to the track. It will be neither positive nor negative. The axle will always bisect the angle between the cars.

From the foregoing description and disclosure it will be seen that a very simple wheel positioning device for single axle articulated trains has been devised which will position the axle relative to the train cars so that the train may be bi-directional, i.e., operated in both directions at will. This is important in many train systems.

I claim:

1. In an articulated train, a pair of adjacent cars, an axle extending transversely of said cars, a pair of wheels fixedly mounted at their centers to said axle adjacent its ends and adapted to rotate together, means supporting said axle between said adjacent cars in a position to engage the track upon which the train is adapted to run and allowing for limited angular movement of said axle with respect to said adjacent cars, said wheels being spaced from each other an amount consistent with the gauge of the said track, means maintaining said axle along the bisector of any angle which exists between the said adjacent cars, and including two pairs of elongated drag links, one pair being positioned on each side of said axle generally perpendicular to the axle and extending generally horizontally so as to be substantially parallel to the plane of the tracks upon which the train is adapted to run when the train is positioned thereon, one pair of said drag links being attached remote from said axle to one of said adjacent cars, the other pair of said drag links being attached remote from said axle to the other of said adjacent cars, each of the drag links of one pair having an end adjacent an end of an opposite drag link of the other pair, means mounting the adjacent opposing ends of said drag links to said axle for angular displacement of the drag link as a whole with respect to said axle and in force transmitting relation thereto longitudinally of said links, each of said drag links being provided between its point of mounting to said axle and the point of its attachment remote from said axle to its respective car with a high-pitch threaded joint, each of said links being straight at least in the region of said threaded joint, the portion of each link on the axle side of said high-pitch threaded joint being rotatably mounted with respect to the portion thereof on the other side of said joint, the adjacent opposing ends of said drag links being coaxially aligned, said link end axle mounting means interconnecting said adjacent opposing link ends for simultaneous rotation, the high-pitch threaded joints of both of said drag links being not substantially angulated with respect to one another, the portion of each drag link attached to its respective car being fixed against appreciable longitudinal and rotational displacement with respect to its respective car, and the portion of each said link end mounted to said axle being fixed against appreciable longitudinal displacement with respect to said axle, the pitch of the threaded joint with which each drag link is provided being of sufficient magnitude to cause threading and unthreading thereof upon application of longitudinal forces to thereby cause lengthening and shortening of said drag links, the threaded joint of one of said drag links being right-handed, and the threaded joint of the other of said drag links being left-handed, whereby said axle always bisects any angle between said adjacent cars.

2. A device as defined in claim 1 in which said link end axle mounting means interconnecting the adjacent opposing ends of said drag links for simultaneous rotation includes a shaft rotatably housed in a mounting provided on said axle, said adjacent opposing ends of said drag links being pivotally connected in torque transmitting relation to opposite end portions of said shaft.

References Cited in the file of this patent

UNITED STATES PATENTS

| 397,902 | Elliott | Feb. 19, 1889 |
| 2,746,399 | Tomas | May 22, 1956 |